United States Patent
Elkin et al.

(10) Patent No.: US 11,861,520 B2
(45) Date of Patent: Jan. 2, 2024

(54) CROP MONITORING SYSTEM AND METHOD THEREOF

(71) Applicant: Planet Watchers Ltd., Tel Aviv (IL)

(72) Inventors: Ori Elkin, Lachish (IL); Benny Kupfer, Givat Shmuel (IL); Idan Tobis, Beth Hashmonai (IL); Amihai Granot, Kibbutz Dorot (IL); Dante Birger, Tel Aviv (IL); Ori Schuftan, Tel Aviv (IL); Roi Shilo, Bnaya (IL)

(73) Assignee: PLANET WATCHERS LTD., Tel-Aviv (IL)

( * ) Notice: Subject to any disclaimer, the term of this patent is extended or adjusted under 35 U.S.C. 154(b) by 0 days.

(21) Appl. No.: 18/124,045

(22) Filed: Mar. 21, 2023

(65) Prior Publication Data
US 2023/0316116 A1  Oct. 5, 2023

Related U.S. Application Data

(60) Provisional application No. 63/362,326, filed on Mar. 31, 2022.

(51) Int. Cl.
*G06N 7/01* (2023.01)
*G06N 3/0464* (2023.01)

(52) U.S. Cl.
CPC ............. *G06N 7/01* (2023.01); *G06N 3/0464* (2023.01)

(58) Field of Classification Search
None
See application file for complete search history.

(56) References Cited

U.S. PATENT DOCUMENTS

| | | | |
|---|---|---|---|
| 11,080,798 B2* | 8/2021 | Ethington | G06Q 10/04 |
| 11,113,649 B2* | 9/2021 | Ethington | G06Q 10/04 |
| 11,406,053 B1* | 8/2022 | Hu | G06N 20/00 |
| 2017/0329048 A1* | 11/2017 | Lemos | G06F 17/18 |
| 2019/0050948 A1* | 2/2019 | Perry | A01B 79/005 |
| 2019/0147094 A1* | 5/2019 | Zhan | A01G 22/00 707/718 |
| 2020/0202127 A1* | 6/2020 | Chen | G06V 20/188 |
| 2022/0061236 A1* | 3/2022 | Guan | A01G 7/00 |
| 2023/0078852 A1* | 3/2023 | Campbell | G06Q 50/02 |

* cited by examiner

*Primary Examiner* — Alan Chen
(74) *Attorney, Agent, or Firm* — AlphaPatent Associates Ltd.; Daniel J. Swirsky

(57) ABSTRACT

An agricultural monitoring system, apparatus and method(s) for providing crop-related forecasts by performing the steps of receiving seasonal image data from at least one source, where the seasonal image data is associated with at least one agricultural field, processing the seasonal image data using a Bayesian framework, where the Bayesian framework comprises one or more crop models configured to predict, based on the seasonal image data, one or more probabilities indicative of at least one crop state, updating at least one crop model of the Bayesian framework based on the one or more probabilities, and outputting a forecast of the at least one crop state based on the one or more probabilities.

19 Claims, 15 Drawing Sheets

CROP MONITORING SYSTEM AND METHOD THEREOF

FIELD

The present application relates to an agricultural monitoring system, apparatus and method(s) that provide crop-related forecasting based on crop states analysed statistically using model(s) trained on various data sources.

BACKGROUND

Limited solutions exist today for predicting the state of the crop (i.e. performing crop classification) in an accurate and reliable manner. Some of these existing solutions involve using optically obtained statistical intensity data. (i.e. performing statistical analysis using means and standard deviation of the data) Such data may comprise images or data representation of the images, for example, showing an exemplary crop situated in an agricultural field. During the analysis, most existing solutions tend to ignore or neglect important attributes in the images, such as "speckle", which is found to contribute to the phases of the crop in the growth cycle.

In addition, many existing solutions fail to consider the seasonality in the data during the analysis. For example, some solutions only use images taken during the planting season while disregarding data from prior planting seasons or any historical data of the agricultural field therefrom. Much of the information contained in the data is thus lost and omitted during further analysis.

It is understood contrary to the assumptions underpinning the existing solutions that the "speckle" and other similar attributes observed in the data hold more than expected information. This information uncovered can be utilized to discern the behavior of historical agricultural data (i.e. historical Common Land Unit data) of interest. Such information may comprise attributes that could be used in crop classification, for example, determining a crop type during the growth cycle (in the current season) without the need to wait for the completion of the growth to take place.

Further, it is found that about 85% of the information needed to predict the type of crop comes from imagery taken not during, but prior to the start of the planting season, based on the proprietary data on the history of the agricultural field.

For these above reasons, it is desired to develop an agricultural monitoring system, apparatus and method(s) that can address at least the shortcomings of the existing solutions, for example, by providing further analysis directed to crop states and taking into account the relevant information from historical and seasonal data sources.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the invention, nor is it intended to be used to determine the scope of the invention; variants and alternative features which facilitate the working of the invention and/or serve to achieve a substantially similar technical effect should be considered as falling into the scope of the invention disclosed herein.

The present disclosure provides agricultural monitoring system, apparatus and method(s) for delivering crop-related forecasting based on one or more crop states and the relationship therebetween. The crop states are analysed statistically using machine learning (ML) model(s) underpinned by a Bayesian framework that accounts for seasonality in the input data. Each crop model is trained separately with respect to a given crop state, i.e. planting dates, acreage, crop classification, harvest and yield from the previous agricultural season(s) in order to infer the same for the upcoming (or current) agricultural season. The following additional aspects of the invention are provided by the present disclosure.

In a first aspect, the present disclosure provides a computer-implemented method of forecasting and/or inferring crop states based on at least one data source, the method comprising: receiving seasonal image data from at least one source, wherein the seasonal image data is associated with at least one agricultural field; processing the seasonal image data using a Bayesian framework, wherein the Bayesian framework comprises one or more crop models configured to predict, based on the seasonal image data and CLU historical data, one or more probabilities indicative of at least one crop state; updating at least one crop model of the Bayesian framework based on said one or more probabilities; and outputting a forecast of said at least one crop state based on said one or more probabilities.

In a second aspect, the present disclosure provides a system for monitoring crop growth in an agricultural field, the system comprising: one or more modules adapted to forecast one or more crop states based on seasonal image data obtained from at least one source, wherein said one or more modules are configured to: receive the seasonal image data comprises one or more images associated with at least one crop type, wherein the seasonal image data, when obtained from two or more sources, can be combined using one or more unifying algorithms configured to fuse said one or more images for processing by a Bayesian framework, wherein the Bayesian framework comprises one or more crop models configured to predict, based on the received seasonal image data, one or more probabilities indicative of at least one crop state; update at least one crop model of the Bayesian framework based on said one or more probabilities, wherein said at least one crop model comprises a base model associated with said at least one crop type; and output a forecast of said at least one crop state based on said one or more probabilities.

In a third aspect, the present disclosure provides a Bayesian framework for determining one or more probability of a crop state given predetermined probability distribution associated with the crop state estimated from one or more previous agricultural seasons, the framework comprising: one or more crop models configured to forecast a plurality of crop state, wherein each crop state is predicted using a crop model trained using seasonal image data from a previous agricultural season; and wherein the Bayesian framework is iteratively updated with respect to further seasonal image data obtained from one or more following agricultural seasons to the previous agricultural season.

In a fourth aspect, the present disclosure provides a computer-readable medium comprising data or instruction code which, when executed on a processor, causes the processor to perform a method according to any one of the above aspects. The present disclosure also provides, in a fifth aspect, an apparatus comprising a processor unit, a memory unit, a communications interface, the processor unit connected to the memory unit and communications interface, wherein the apparatus is adapted to perform a step or process according to any one of the above aspects.

It is understood that the methods or method steps described herein may be performed by software in machine-readable form on a tangible storage medium e.g. in the form of a computer program comprising computer program code means adapted to perform all the steps of any of the methods described herein when the program is run on a computer and where the computer program may be embodied on a computer-readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The options or optional features described in any of the following sections may be combined as appropriate, as would be apparent to a skilled person, with any one or more aspects of the invention.

BRIEF DESCRIPTION OF THE DRAWINGS

Embodiments of the invention will be described, by way of example, with reference to the following drawings, in which.

Figure 1:
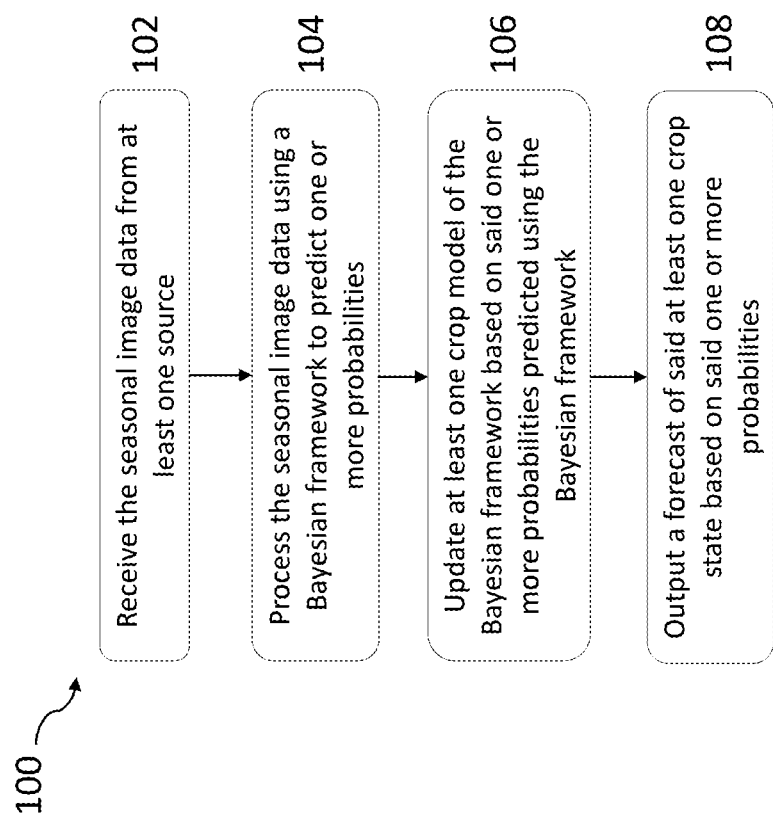
FIG. 1 is a flow diagram illustrating an example of forecasting crop states based on seasonal image data according to an embodiment of the invention.

Common reference numerals are used throughout the figures to indicate similar features.

DETAILED DESCRIPTION

Embodiments of the invention are described below by way of example only. These examples represent the suitable modes of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure offers a crop monitoring solution that incorporates the use of both historical agricultural data and seasonal image data. The seasonal image data may be obtained from multi-annual satellite imagery and fused into a combined dataset that is used in part to train one or more crop models within a Bayesian framework in providing crop monitoring. One or more crop models may be one or more machine learning models or configured to apply one or more machine learning methods or techniques described herein. The application of the Bayesian framework accounts for seasonality (i.e. pre-season and in-season) in the image data by iteratively applying to the results of the crop models (in the pre-season or previous season) as "prior" to one or more crop states (in the season or following seasons). Each crop state is thereby analysed statistically and aggregately in the Bayesian framework for predicting, in a more accurate and reliable manner, the crop states corresponding to the entirety of the crop cycle, which includes predictions such as planting dates, acreage, crop classification, harvest and yield.

The seasonal image data used by the Bayesian framework could be obtained for one or more agricultural fields. Each agricultural field, referring to a unit of area in which at least one crop is situated, provides the soil for growing such crop or other high-value plant species. This unit of area may be highly managed and often provisioned with artificial nutrients (i.e. fertilized) to the extent exhibited by the seasonal image data. At least one crop species may grow in an agricultural field at any particular time such that, in a given agricultural field, a multitude of crop species may grow in an agricultural season.

The seasonal image data herein refer to data with the characteristic of a time series in which the data experiences regular and predictable changes that recur every calendar year. Seasonal image data comprises one or more images or data representations of said one or more images. The raw season image data obtained externally may be processed or pre-processed. The processed season image data may be used as training data for training one or more crop models of the Bayesian framework. The seasonal image data can be obtained from at least one source, i.e. satellite imagery. For example, seasonal image data may data obtained from a synthetic aperture radar (SAR) satellite and/or an optical imagery satellite. Examples of historical agricultural data and seasonal image data are shown in FIGS. 7 to 10.

The seasonal image data for an agricultural field retains certain information on or about the particular crop or species of the crop, which may be used to infer crop states. Historical agricultural data with respect to the same will retain the same or similar information, which corresponds to the seasonal image data in some manner, whether it is for a planting date, classification, harvest, yield, or any other crop state described herein.

A crop state, or equivalently, a particular state of a crop, refers to the condition of the crop characterized by at least one objective criterion associated with the crop upon an event or activities performed for the crop in one or more agricultural seasons when the crop is present on the agricultural field being considered. A crop state may be a type of crop type, time passed after a crop planting date, a crop yield, a crop acreage, a crop emergence date, a crop harvest, or damage to the crop.

A crop type refers to the classification of the crop or plant species. For example, crop classification maps or mapping may result from or derivative of the data source for agricultural monitoring and acreage reporting.

A crop planting date refers to the planting date or a limited range of dates that have been forecasted and/or based on a combination of crop or plant species in a certain field. The date or range of dates is presented with respect to the likelihood that planting will occur on or before such date(s) in the following or predicted agricultural season. For example, the crop planting date forecast may be 66% probability of planting within 7 days of April 15th for corn in a certain field.

A crop yield refers to an estimation of the amount of agricultural production harvested per unit of land area in the monitored agricultural field based on one or more crop states. The estimated yield may be measured in bushels, tons, or pounds per acre, and such measurement may be compared or validated after harvesting has taken place.

A crop emergence date refers to the date or a range of dates that has been forecasted for a combination of a crop or plant species and a field, where the crop or plant species first emerges, which can be a critical input to models of crop development and biomass accumulation. The crop emergence data may be (the date) when the crop established leaves during the vegetative stage. For example, the crop emergence date may correspond to a 75% probability that the crop emerged between May 23rd and May 26th.

A crop harvest date refers to a determination of the date with which the crop is to be harvested in a certain field, where significant biomass for the crop has accumulated concerning the crop type. The crop harvest determination may help validate the other crop states, such as crop planation date, crop emergence data, and crop yield.

The damage to the crop refers to harm caused by events that are adverse to the continued growth of the crop. For example, the events may comprise flood, drought, high wind, other environmental factors causing the crop stress, or inherent factors such as disease to which the crop may be afflicted. The damage may be presented and could result from whether such adverse events will likely occur in the following or agricultural season of interest.

The agricultural season may be defined for each crop type and extend to a period in which the crop is grown or has been growing. For example, the agricultural season may be a period in which the crop, depending on whether a cover crop exists, is planted to a second period when the crop has been harvested and is no longer present in the field or replaced by a cover crop. For an agricultural season, whether the crop is present or absent from the agricultural field may be determined iteratively using the Bayesian framework described herein. The Bayesian framework is configured to include the seasonality while capturing attributes in the data that would otherwise be missed.

The Bayesian framework refers to one or more statistical-based models compatible with seasonal data or data with time-series characteristics. The framework is used to discover or predict the causations with its counterfactual prediction with respect to the observable data, such as the seasonal image data herein described. The models may include techniques for time series decomposition, where different state variables, i.e. trend, seasonality, and regression, may be included. The models also include predictors that are selected for regression analysis, where regression results may be combined in turn.

Given the exemplary Bayes' theorem, where $$P(A|B) = \frac{P(A \cap B)}{P(B)}$$

the implementation of the Bayesian framework may be depicted as: the probability of the predictions of each of the models' change (increases or decreases) proportionally with respect to the results of the other models, e.g. assuming that event A describes the situation that [John Smith's field was planted on May 15th] and that event B describes the situation where [the crop on John Smith's field has emerged on June 7th], it can be understood that the time it takes this crop to emerge (from literature) is a normal distribution with a mean at 21 days and a standard deviation of 7 days. Since it is easier to analyse SAR imagery for emergence than for planting date, we can recalculate, using the exemplary Bayes' theorem, the probability that event A occurred, given that we "know" (or at least believe that we know) the occurrence of event B (the "prior" in this case) can be computed with respect to the pertinent crop model.

Herein described one or more probabilities computed by the Bayesian framework refers to or could describe as the likelihood of an event occurring given a condition reflected by the crop state, where the likelihood may be presented as a percentage. One or more possibilities may comprise or be inferred from one or more conditional probabilities, marginal probabilities, joint probabilities, probabilities, etc., using with or as an aspect of the Bayesian framework described herein. The Bayesian framework derives from the seasonal data (or historical data) prior probability distribution or referring herein as prior or prior probability. The Bayesian framework uses the prior probability distribution and a likelihood function, or joint probability of the seasonal image as a function of the parameters of a crop model, to produce a posterior probability distribution and provide thereafter said one or more probabilities of a crop state. For each crop state or herein described crop model, the Bayesian framework may separately designate, for each crop model, a density of a random variable whose probability distribution is continuous with respect to model input.

The following figures refer with respect to any of the above concepts in providing any of the herein described agricultural monitoring system, apparatus and method for delivering crop-related forecasting based on one or more crop states in a more accurate and reliable manner while overcoming the disadvantages in the existing solutions such as missed or ignored attributes during data processing and the at least partial disregarded of seasonality in data when deploying sequential machine learning methods.

FIG. 1 is a flow diagram illustrating an example process 100 of forecasting crop states based on historical and/or seasonal image data relating to at least one aspect of the crop monitoring system described herein. Process 100 applies a Bayesian framework to predict the conditional likelihood of a crop state in the season taking place, given the data from the previous agricultural season(s) in an iterative manner. A crop state may include but are not limited to a crop type, a crop planting date, a crop yield, a crop acreage, a crop emergence date, a crop harvest date, and damage to the crop. Each state may be correlated with another state on which the forecast is based.

In step 102, the seasonal image data associated with at least one agricultural field is obtained or received from at least one source. Such source or sources may comprise one or more satellite sources. For example, the satellite may be a SAR satellite and/or an optical imagery satellite, where multi-annual satellite imagery can be readily obtained or obtained through indirect means.

Further, the historical agricultural data such as annotated historical common land unit data may be used in combination with the seasonal image data during the crop models training. The images obtained from the satellite data may be fused or aggregated to provide a combined data set herein coined as seasonal image data. The seasonal image data may also be used in connection with the historical agricultural data.

In step 104, the seasonal image data is processed using a Bayesian framework. The Bayesian framework comprises one or more (ML or statistical) models described herein, where the models are configured to predict, based on the seasonal image data, one or more probabilities indicative of the crop states. The models may be selected from, for example, a crop planting date prediction model, crop yield prediction model, crop acreage model, cover crop model, crop emergence date model, crop harvest model, and crop damage model.

The models of the Bayesian framework may be trained separately or otherwise dependently using the seasonal image data annotated with respect to at least one crop from said at least one agricultural field.

More specifically, each crop model is adapted to learn from a subset of seasonal image data, wherein the subset comprises images outputted from a data source that is different to the data source used in another crop model when more than one crop model is/are being used to determine said at least one crop state.

Each crop model may further comprise a base model conditioned on at least two crop states in a previous agricultural season. The base model is representative of a prior probability distribution used for predicting the state of the crop in the subsequent agricultural season or in the next iteration of recalibrating the same or additional crop models.

More specifically, the Bayesian framework may be configured to determine a crop state in a previous agricultural season using seasonal image data of the previous agricultural season; and recalibrating said one or more probabilities based on the configuration, adapting the Bayesian framework to the outputs of said one or more crop models in accordance with step 106.

Further, the received seasonal image data may be processed with respect to each pixel (or related pixels) of an image in the data, corresponding to a crop planted in said at least one agricultural field.

Furthermore, at least one base model is trained using annotated historical common land unit data in order to predict said at least two crop states in the agricultural season that follows from a previous agricultural season. Using the seasonal image data obtained, said at least two crop states in the agricultural season are calculated, at least in part, where the calculation may be performed initially according to the base model and thereafter configured to generate the forecast of said at least one crop state based on further seasonal image data.

In step 106, at least one crop model of the Bayesian framework is updated based on said one or more probabilities, wherein said one or more probabilities are adapted to, or to be, the outputs of said one or more crop models.

More specifically, in relation to step 104 and/or step 106, the Bayesian framework is configured to: classify, based on a crop type, at least one crop from at least one subset of the seasonal image data; determine said one or more probabilities for each classified crop; and update the Bayesian framework based on the classification in relation to said one or more probabilities.

In step 108, a forecast of said at least one crop state is outputted based on said one or more probabilities as described herein. The Bayesian framework and its underlying crop models are used to predict at least one crop state in a following agricultural season with respect to said one or more probabilities. The prediction is based on the seasonal image data from at least one agricultural season, where events captured by the seasonal images data may comprise that the crop will be planted on or before the crop planting date.

Further, each crop model of the Bayesian framework may be configured to generate at least in part the forecast of said at least one crop state in accordance with said one or more probabilities. A particular crop state prediction may be generated as output, where crop state prediction may be associated with said at least one agricultural field in relation to the seasonal image data from at least one agricultural season.

More specifically, the Bayesian framework and its underlying crop models are applicable for predicting a crop yield result using at least one crop yield prediction model, wherein the crop yield prediction model is configured to characterize growth of at least one crop in order to provide the crop yield result; and/or predicting an acreage estimate of a crop in said at least one agricultural field, wherein the acreage estimate is generated by a crop acreage model configured to characterize growth of the crop in said at least one agricultural field, and calculating, based on the growth, the acreage estimate of the crop; and/or predicting a cover crop type of a crop using a cover crop model configured to characterize growth of the crop; and determining, based on the growth, the cover crop type from one or more possible types of cover crops; and/or predicting a date of crop emergence using a crop emergence date model, wherein the date of crop emergence corresponds to a probability indicative of a potential emergence event that will occur or will not occur, on or before said date; predicting a crop harvest using a crop harvest model configured to determine when a harvest event needs to take place in a following agriculture season based on a probability indicative of a crop state; and/or predicting a damage to crop using a crop damage model configured to identify based on a crop state the damage to the crop has or will take place.

The process of crop monitoring may also include, with respect to the Bayesian framework, a step for validating each crop model based on the output of at least one other crop model; and updating at least one model in the Bayesian framework based on the validation. The other crop model may be constructed using actual data collected during the season, or based on another correlated crop model in the framework. For example, the validation may be performed because seasonal image data (specifically SAR satellite data) contains both amplitude and phase. The amplitude and phase may be used to compute the following exemplary coherence coefficient:

$$\gamma = \frac{\left|\sum\sum I_1 I_2^*\right|}{\sqrt{\sum\sum |I_1|^2 \sum\sum |I_2|^2}},$$

where $I_1, I_2$ represent two (complex) SAR images taken from the same angle at different times and an asterisk represents the complex conjugate. By definition the coherence coefficient is normalized between 0 to 1. The coherence represents the change between the images per pixel, i.e. significant changes are represented by black pixels (values close to 0) while unchanged areas are represented by white pixels (values close to 1).

Further, various environmental factors affect the amplitude and phase. These factors include weather/climate events such as rain, winds, thermal, which cause damage to the crop. These factors may be modelled by one or more crop models described herein and similarly validated using one or more ML methods or techniques described herein.

Figure 2:
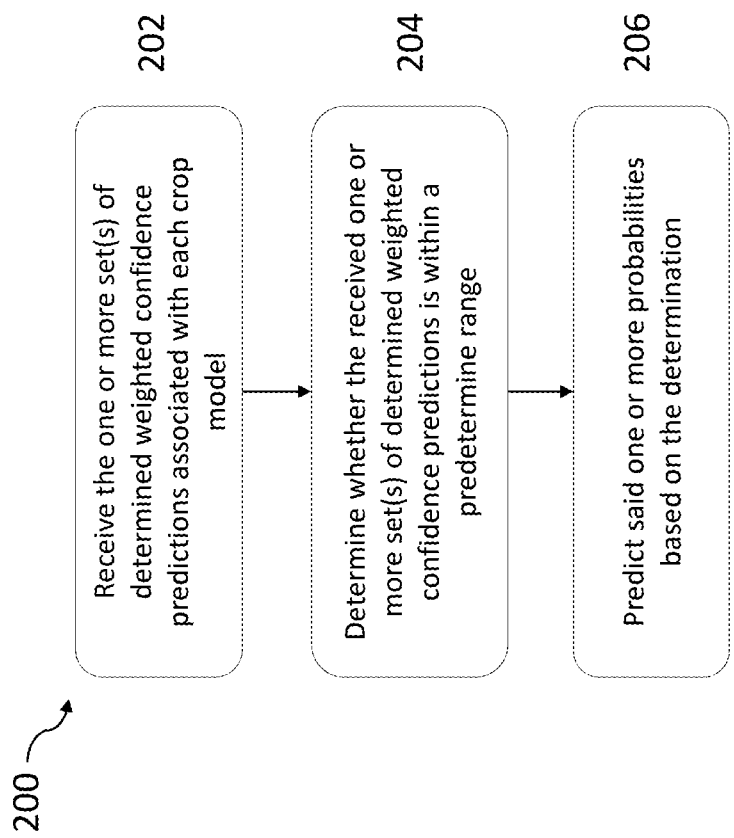
FIG. 2 is a flow diagram illustrating an example of predicting the probabilities of a crop state for an agricultural season conditioned on one or more states of the crop in the prior seasons of said agricultural season according to an embodiment of the invention.

FIG. 2 is a flow diagram illustrating an example process 200 of predicting the probabilities of a crop state for an agricultural season conditioned on states of the crop in the prior seasons of the agricultural season according to the one or more described aspects of the present disclosure. In this process 200, more specifically, the Bayesian framework is being updated iteratively using further seasonal image data. The update is progressed in relation to the weighted confidence information associated with the underlying crop models. The update may be constrained by the weighted confidence predictions of each crop model.

Herein described weighted confidence information refers to data representative of model parameters or weights corresponding to relevant model features of a particular crop model in the framework. The weighted confidence predictions are resultant output, which may be presented in the form of said one or more probabilities described herein.

In step 202, the Bayesian framework or module associated with the framework is configured to receive one or more set(s) of weighted confidence predictions, where the weighted confidence predictions are associated with at least one probability generated from each crop model.

In step 204, whether the received one or more set(s) of weighted confidence predictions fall within a predetermined range is determined. The predetermined range may be one or more thresholds to which the model applies in order to assess the weighted confidence predictions as part of the forecast. In one example, the predetermined range may represent an objective criterion associated with the crop upon an event or activities performed with respect to the crop in one or more agricultural seasons. In another example, the predetermined range may correspond to one or more sets of rules or filters. In yet another example, the predetermined range may correspond to a set of dynamic rules amongst at least two crop models with respect to the Bayesian framework.

In further examples, if the received information is not within the predetermined range, a separate set of weighted confidence information different from the received one or more set(s) of weighted confidence predictions may be determined; and such that said one or more probabilities are predicted based on the second set of weighted confidence information in addition to the received one or more set(s) of the weighted confidence information.

Furthermore, each crop model of the Bayesian framework is configured to receive the weighted confidence information from at least one other crop model. Said at least one other crop model may be from a different agricultural field captured in the seasonal image data.

In step 206, said one or more probabilities is predicted based on the determination in step 204. One or more probabilities forms a part of the crop forecasting using the Bayesian framework.

Additionally or optionally, a dynamic rule set amongst at least two crop models of the Bayesian framework may be generated based on said at least one crop state and weighted confidence information associated with said at least two crop models. The dynamic rule set may further contain the Bayesian framework based on the weighted confidence information in order to optimize the predictions.

Further, said at least two crop models can be combined to form an ensemble model based on an order provided by the dynamic rule set, wherein the order is determined based on the output of each of said at least two crop models. The ensemble model may be further updated based on the seasonal image data until the ensemble model is able to predict a crop state in the following agricultural season within at least one confidence interval in relation to the dynamic rule set. As part of the Bayesian framework, the ensemble model provides a forecast of said at least two crop states. Finally, the dynamic rule set may be updated based on the forecast.

Figure 3:
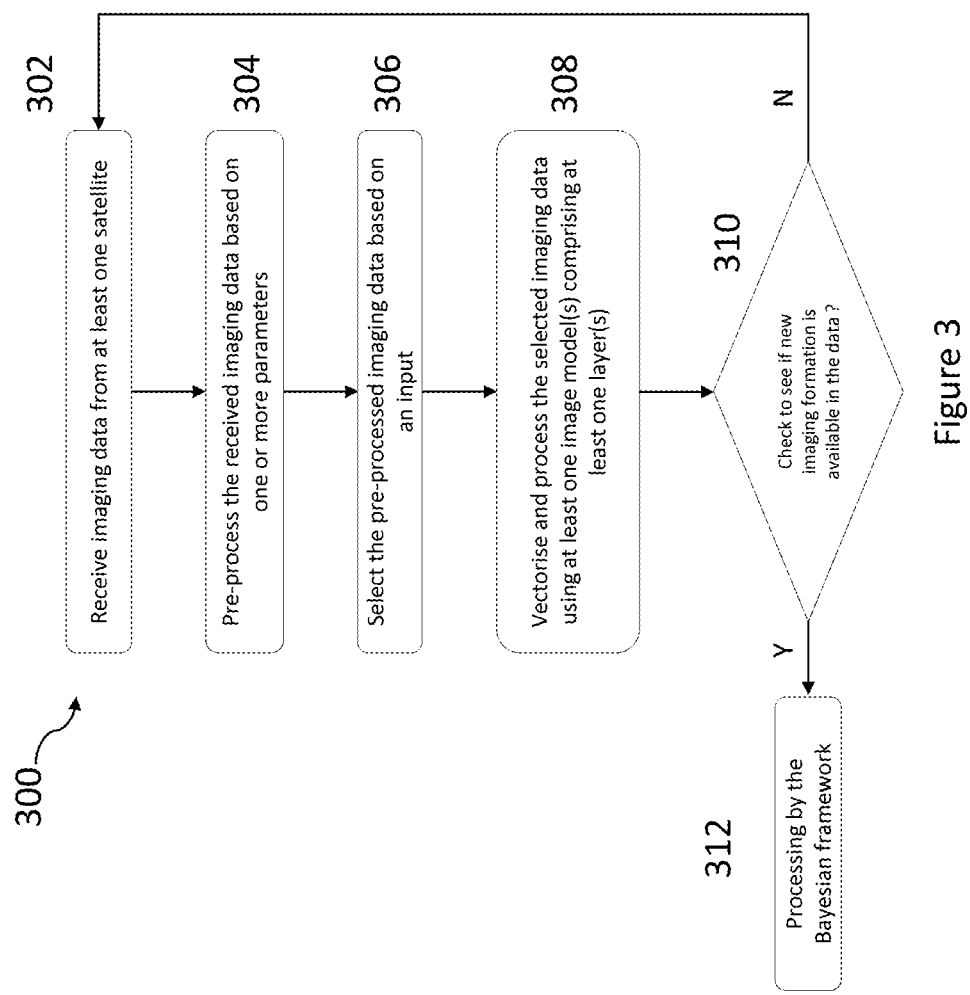
FIG. 3 is a flow diagram illustrating an example of processing the seasonal image data according to an embodiment of the invention.

FIG. 3 is a flow diagram illustrating an example of processing 300 the seasonal image data to be used with the Bayesian framework. The seasonal data may be obtained from multiple sources and fused to form a combined dataset. In obtaining the combined dataset, the data is initially pre-processed according to, for example, the following steps.

In step 302, the seasonal image data is received from at least one satellite, i.e. SAR satellite and/or optical imagery satellite. The seasonal image data may be imagery of the agricultural field.

In step 304, the received seasonal image data is pre-processed based on one or more parameters, where the data may be converted, normalized, augmented, segmented, and standardized based on said one or more parameters. The parameters may differ based on how the data will be used, whether it is purposed for validation, training, or during inference. Similarly, the parameter may be obtained from one or more crop models to which the detail may serve as input.

In step 306, as an option, the pre-processed dataset may be further selected based on an input from a user or a generated system input, where the data is filtered based on the input. For example, the input may comprise instructions to remove a specific section of the data pertaining to a unit of area.

In step 308, the selected image data from the previous steps may be vectorized and further processed using at least one ML model(s) described herein. The models may comprise a neural network of at least one layer(s). The neural network may be pre-train using similar data in order to make a threshold assessment 310 of whether imaging information is in the final selected image data.

Provided that the threshold assessment yields a positive result, the final selected image data is further processed by the Bayesian framework 312. Otherwise, the process will acquire additional seasonal image data, steps 302 to 308 are iterated until assessment 310 is positive.

Figure 4A:
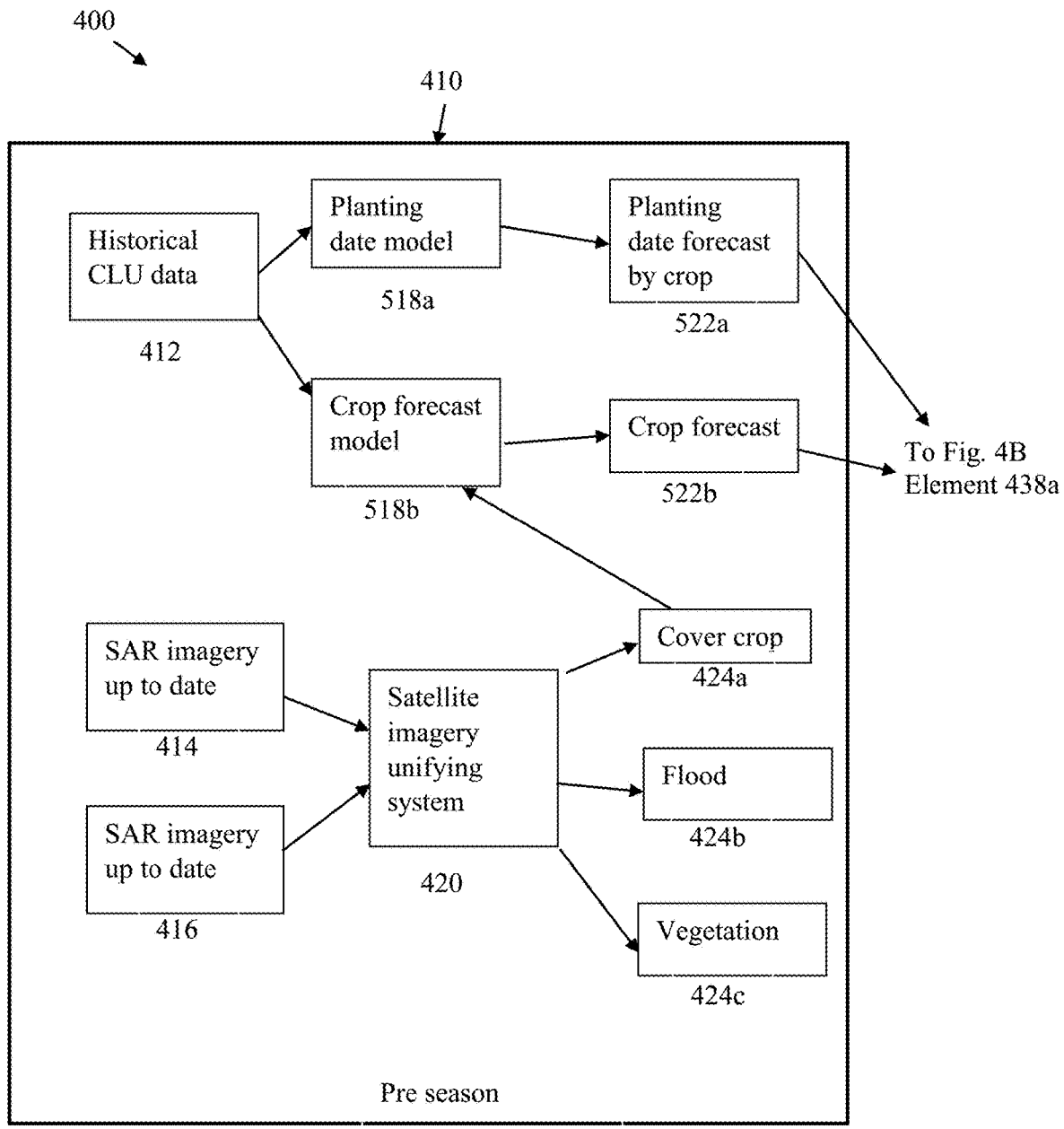
FIGS. 4A-4B are schematic diagrams illustrating an example of a system for monitoring crop growth in an agricultural field according to the invention.
Figure 4B:
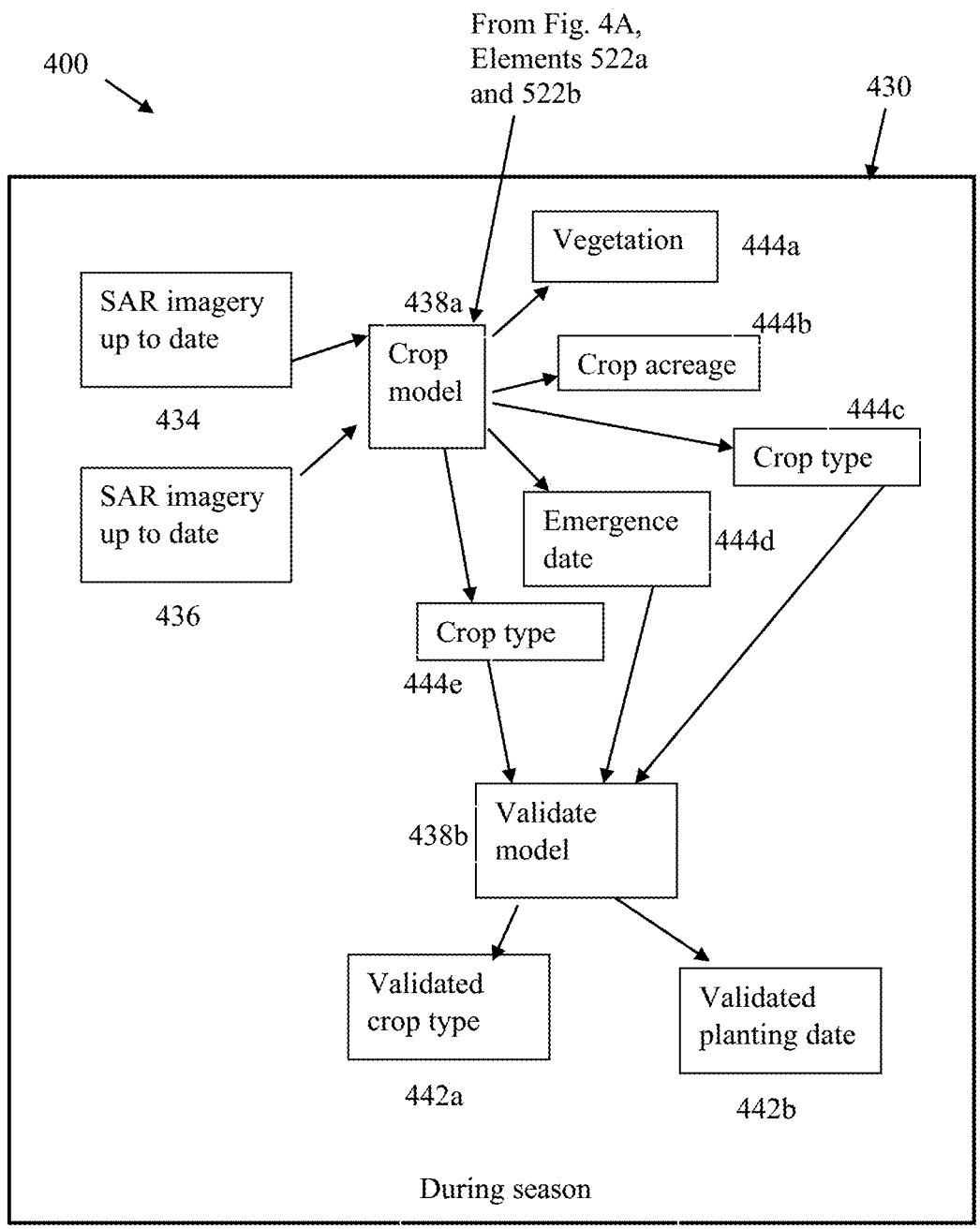

FIGS. 4A-4B are schematic diagrams illustrating an example of a system 400 for monitoring crop growth in an agricultural field. The system may comprise one or more modules adapted to forecast one or more crop states based on seasonal image data obtained from at least one source. The modules are configured to carry out any one or more of the steps described in the present disclosure. The modules of the system may be configured to implement the method steps described according to FIGS. 1 to 3 as one or more aspects of the invention.

For example, said one or more modules may receive the seasonal image data comprises one or more images associated with at least one crop type, where the seasonal image data, when obtained from two or more sources, can be combined using one or more unifying algorithms 420 configured to fuse said one or more images for processing by a Bayesian framework. In both pre-season 410 and during season 430, the unifying algorithm(s) 420 may receive input SAR 414, 434 and optical imagery 416, 436. In pre-season 410, the output crop state prediction(s) may be related to the cover crop 424a, flood likelihood 424b, and vegetation state 424c. During the season, the output crop state prediction(s) may also be related to vegetation 444a, crop acreage 444b, crop type 444c, emergence date 444d, and planting date 444e.

As shown and understood that the pre-season seasonal image data cannot be used directly to forecast crop type and planting date during the season. Instead, the corresponding seasonal image data from satellite imagery may only be used to infer priors probability distribution (or prior) for the forecast model 518b, based on historical (agricultural) data 412, such as data of cover crops or floods occurring before the planting season (or in the previous seasons).

The historical data 412 is provided to train one or more crop models, for example, the crop forecast model 518b. The crop model(s) therefore comprises at least one base model associated with said at least one type of species or crop. The base model, for example, may be associated with either planting data model 518a or crop forecast 518b model, or corresponds to both models in a correlated manner with respect to the historical data 412. In this case, no flooding or cover crops were detected in the pre-season when seasonal image data is considered, and these observations are passed as "prior" to the crop forecast and planting date forecast models, updating the Bayesian framework. The exemplary crop models shown for the pre-season respectively provide a prediction of two crop states: a planting date and crop forecast/type.

The trained crop model(s) of the Bayesian framework is configured to predict, based on the further received seasonal image data during the season, one or more probabilities indicative of at least one crop state in the season. For the current season, or the following seasons, the trained crop model(s) can be or will be updated based on said one or more probabilities provided by the Bayesian framework with respect to the crop states of the previous season. The output of the Bayesian framework may be a forecast of said at least one crop state based on said one or more probabilities indicative of the crop states during the season.

Further, the crop model(s) prediction during the season may be validated by a separate crop validation model 438b. The crop validation model 438b may be constructed using actual data collected during the planting season. The validation may be performed statistically using amplitude and phase in the data. The validation results: validated crop type 442a and validated planting date 442b may be used to update the parameters of the crop model(s)

Figure 5A:
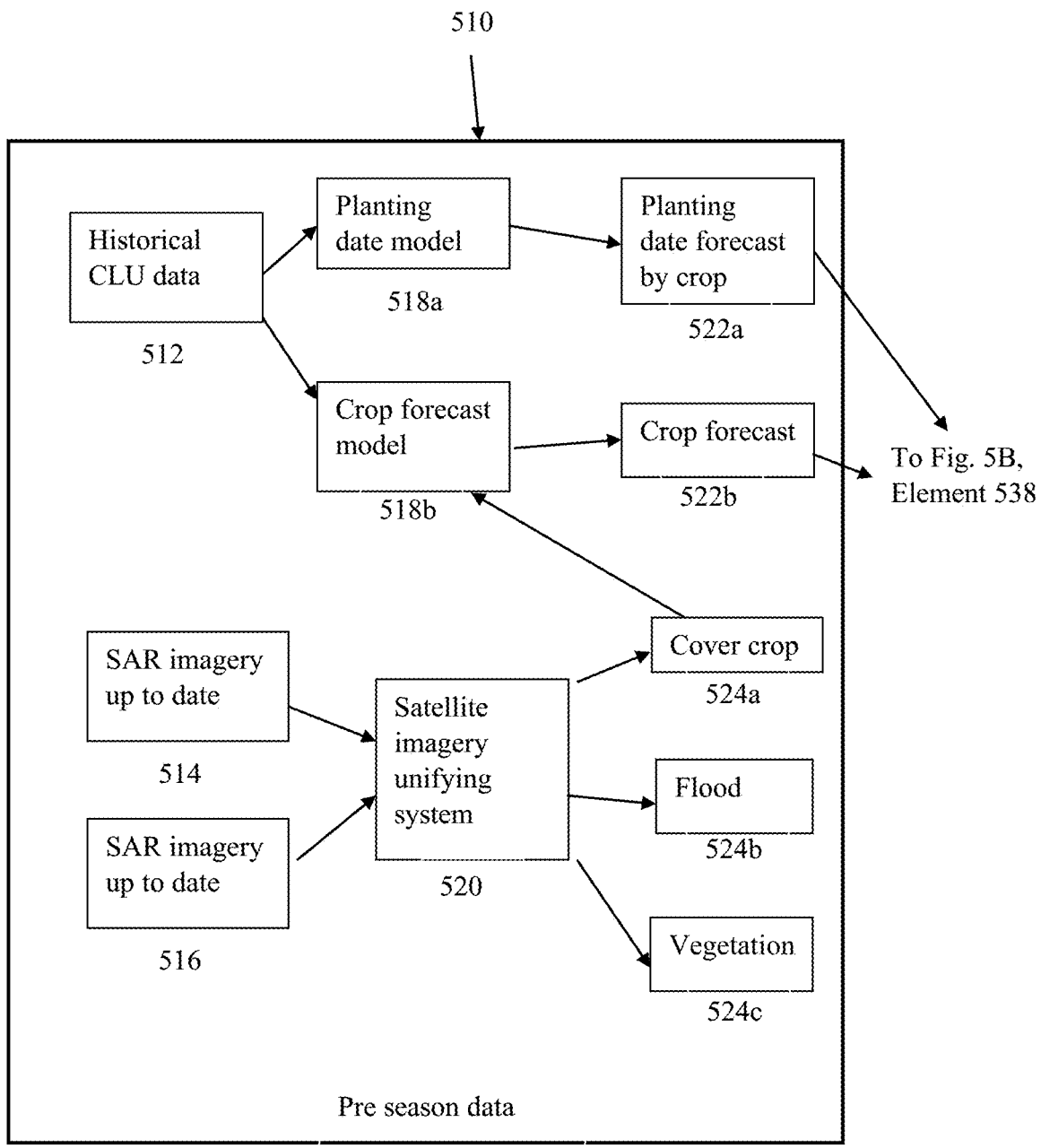
FIGS. 5A-5C are schematic diagrams illustrating an example of another system for monitoring crop growth in an agricultural field according to the invention.
Figure 5B:
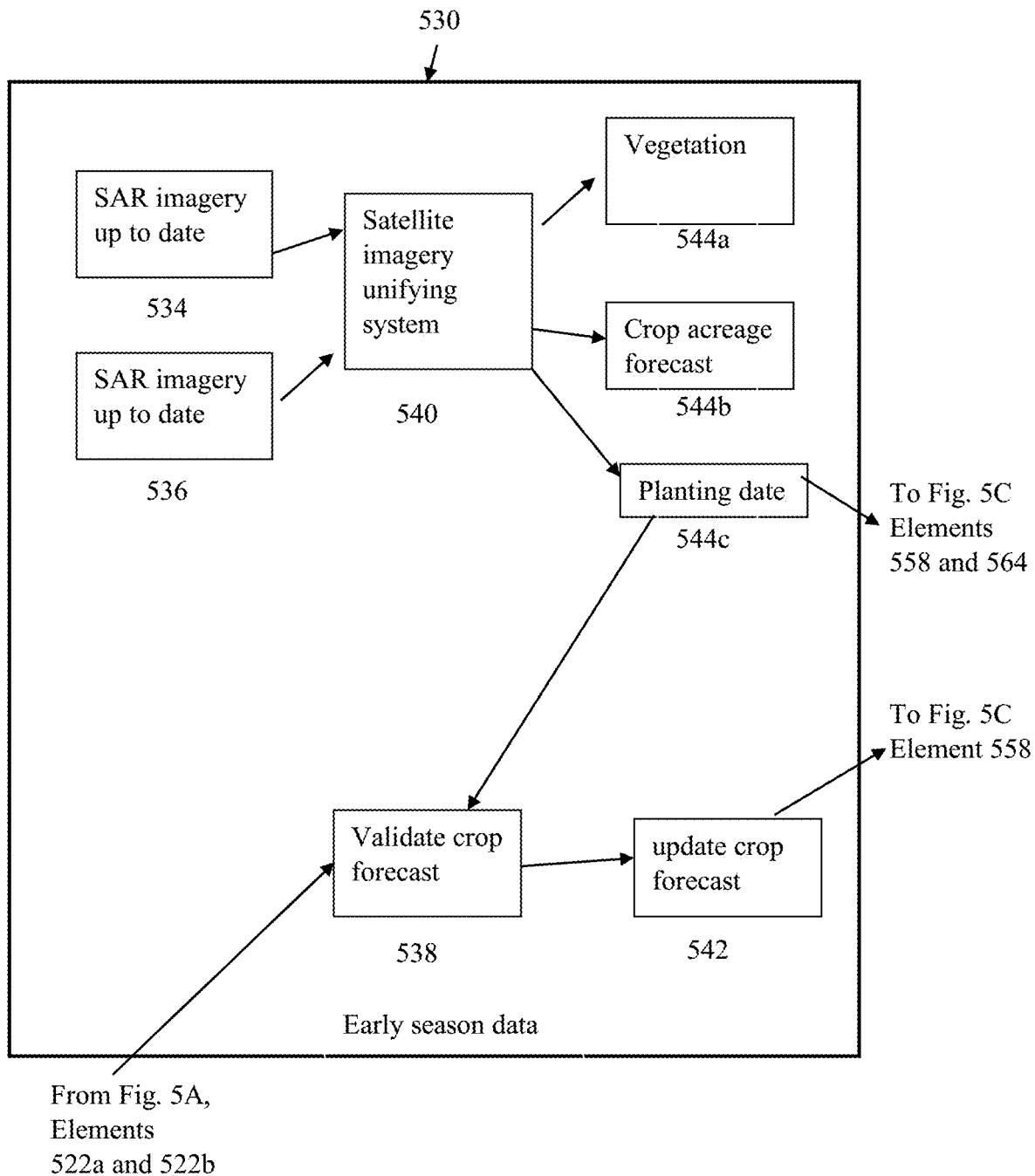
Figure 5C:
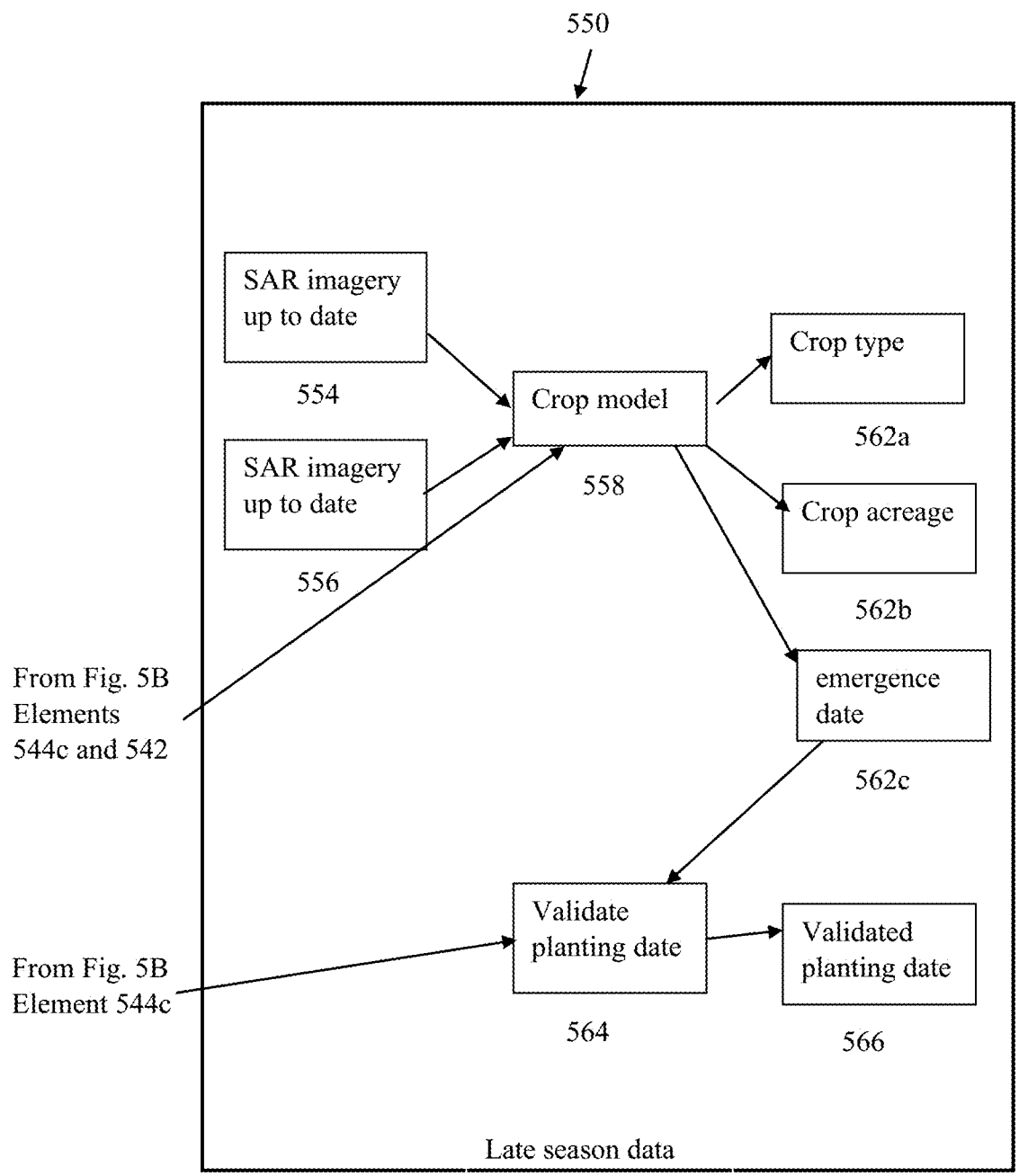

FIGS. 5A-5C are schematic diagrams illustrating an example of another system 500 for monitoring crop growth in an agricultural field, where said other system 500 extends additionally beyond said system 400 according to FIGS. 4A-4B. Unlike said system 400 of FIGS. 4A-4B, said other system 500 of FIGS. 5A-5C illustrates the present season in two stages. The same exemplary data sources used by said system 400 could be used with said other system 500, comprising historical agricultural data 512 in conjunction with seasonal image data from SAR imagery 514 and Optical imagery 516. The said other system 500 may similarly be configured to implement any one or more steps described herein.

The first stage following the pre-season 510 is the early season 530. In relation to the early season 530, it is understood that the seasonal image data from satellite imagery unified (applying satellite unifying algorithm 520 for the pre-season 510 cannot be utilized to forecast crop type 562a in the late season 550 directly. Once the seasonal image data are used to infer planting date in the pre-season, however, the same data may serve as "prior" for the Bayesian framework in order to calculate the crop type in the late season 550 as well as other crop states in the early and late seasons 530, 550, i.e. vegetation 544a, crop acreage 544b, planting date 544c, and emergence date 562c may also be predicted based on the "prior".

For example, in the early season 530, the planting date predictions 554c may serve as "prior" for the Bayesian framework to validation of one or more crop states, i.e. planting date 552a forecast 552b from the pre-season. In the early season, using new SAR imagery data 534 and optical imagery data 536, the planting date 544c predicted in terms of probabilities can be 1) 75% probability that planting occurred between May 5th and May 8th; 2) 12% probability that planting occurred between May 2nd and May 5th; and 3) and 13% probability that planting occurred on another date or not at all. In retrospect, the prediction in the pre-season for planting can be 1) 66% probability of planting within 7 days of April 15th for corn; 2) 78% probability of planting within 7 days of May 1st for soy; 3) 75% probability that soy will be planted next season; 4) 24% probability that corn will be planted next season; and 5) 1% probability of another crop or no crop next season. Since these predictions do not correlate, the model in the pre-season may be invalidated and subsequently updated using the results obtained based on the seasonal image data. The crop forecast 542 calculated from the updated and validated model 538 could be 1) 66% probability that soy was planted; 2) 19% probability that corn was planted; and 3) 15% probability that another crop or no crop was planted. This validation process, inherent to the Bayesian framework, effectively increases the accuracy and reliability of the crop state predictions. The updated crop forecast 542 may in turn be used as "prior" in the calculation of the late season 550.

In the late season 550, it is understood that new SAR 544 and Optic data 554 can be used to infer, for example, emergence date 562c and crop type 562a with high confidence levels compared to another crop state inferences. Because of the high confidence levels, these inferences may be used to validate or invalidate earlier forecasts (crop state predictions from pre-season and early season), such as validating planting date 564 to produce the validated planting date 566. For example, if the predictions from the early season are 1) 66% probability that soy was planted; 2) 19% probability that corn was planted; and 3) 15% probability that another crop or no crop was planted. These predictions may serve as "prior" to the Bayesian framework. Based on the new SAR 544 and Optic data 554, the crop model(s) underlying the framework may predict with high confidence (over 90 percent) that the type of the crop is soy in a 50 crop acreage, and the emergence date is between May 20th and May 23rd. These predictions may be iteratively used to validate the crop model(s).

Figure 6:
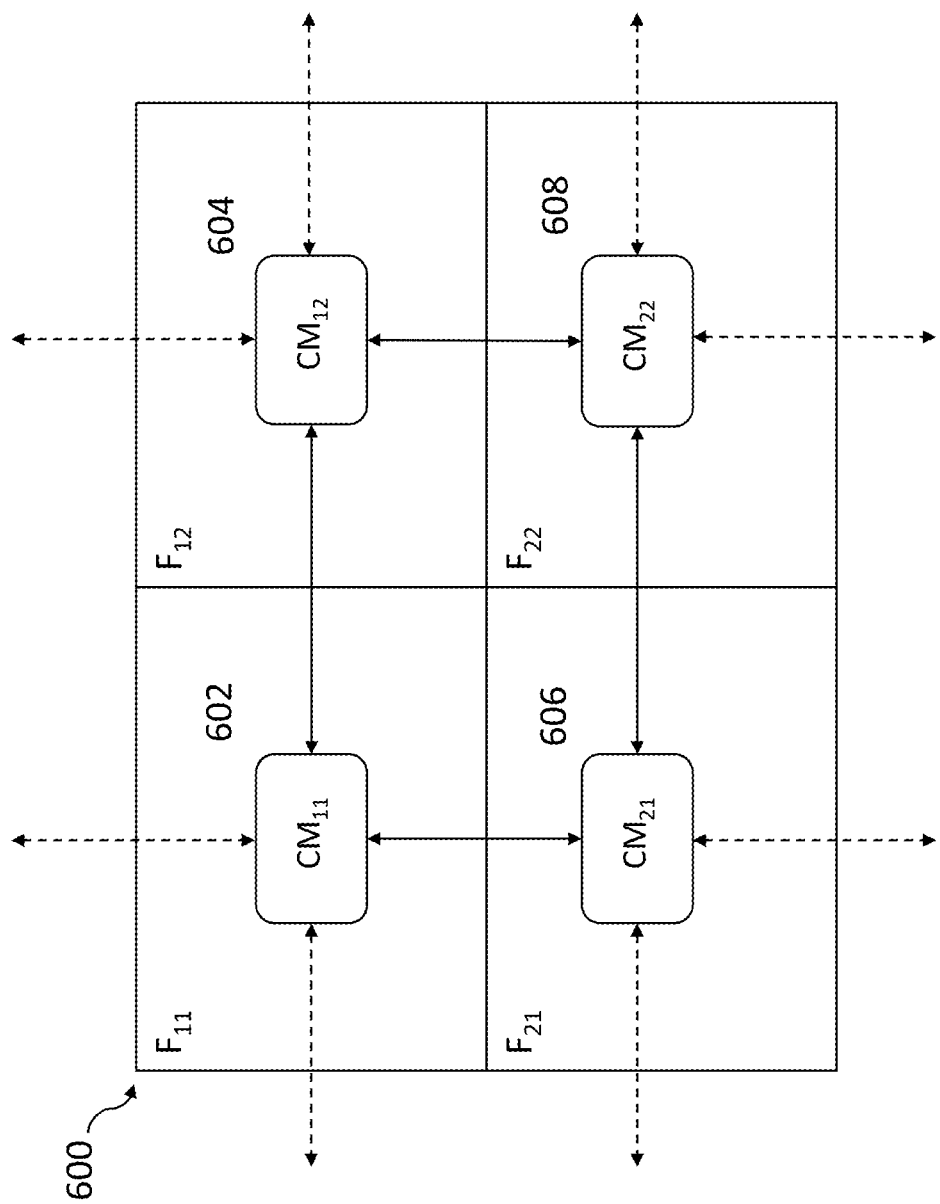
FIG. 6 is a schematic diagram illustrating an example of modelling a plurality of agricultural fields using the Bayesian framework according to an embodiment of the invention.

FIG. 6 is a schematic diagram illustrating an example process 600 for modelling a plurality of agricultural fields using a Bayesian framework configured to determine one or more probabilities of a crop state given predetermined probability distribution associated with the crop state estimated from one or more previous agricultural seasons.

As shown, the Bayesian framework comprises crop model(s) CM11, CM12, CM21, and CM22 configured to forecast a plurality of crop states not shown in the figure, where each crop state is predicted using a crop model trained using seasonal image data from a previous agricultural season. Accordingly, the Bayesian framework is iteratively updated using further seasonal image data obtained from one or more following agricultural seasons to the previous agricultural season. In the figure, the crop model(s) may be configured to model the respective agricultural fields F11 602, F12 604, F21 606, and F22 608. Each crop model may also take into consideration the adjacent fields. For example, CM11 may also model crop state in other agricultural fields F12 602 and F21 604 in addition to F11 such that, when multiple crops are planted, at least one other crop model can be from a different agricultural field. The crop model(s) CM11, CM12, CM21 and CM22 may comprise one or more set(s) of weighted confidence information associated with each base model trained on historical data, the crop model associated with the same or a different agricultural field.

The process 600 shown in FIG. 6 may be incorporated with or serve as part of a further or optional step according to one or more other processes 100, 200, 300 described herein. Accordingly, process 600 may also be part of or used in or with the crop monitoring system(s) described herein.

Figure 7:
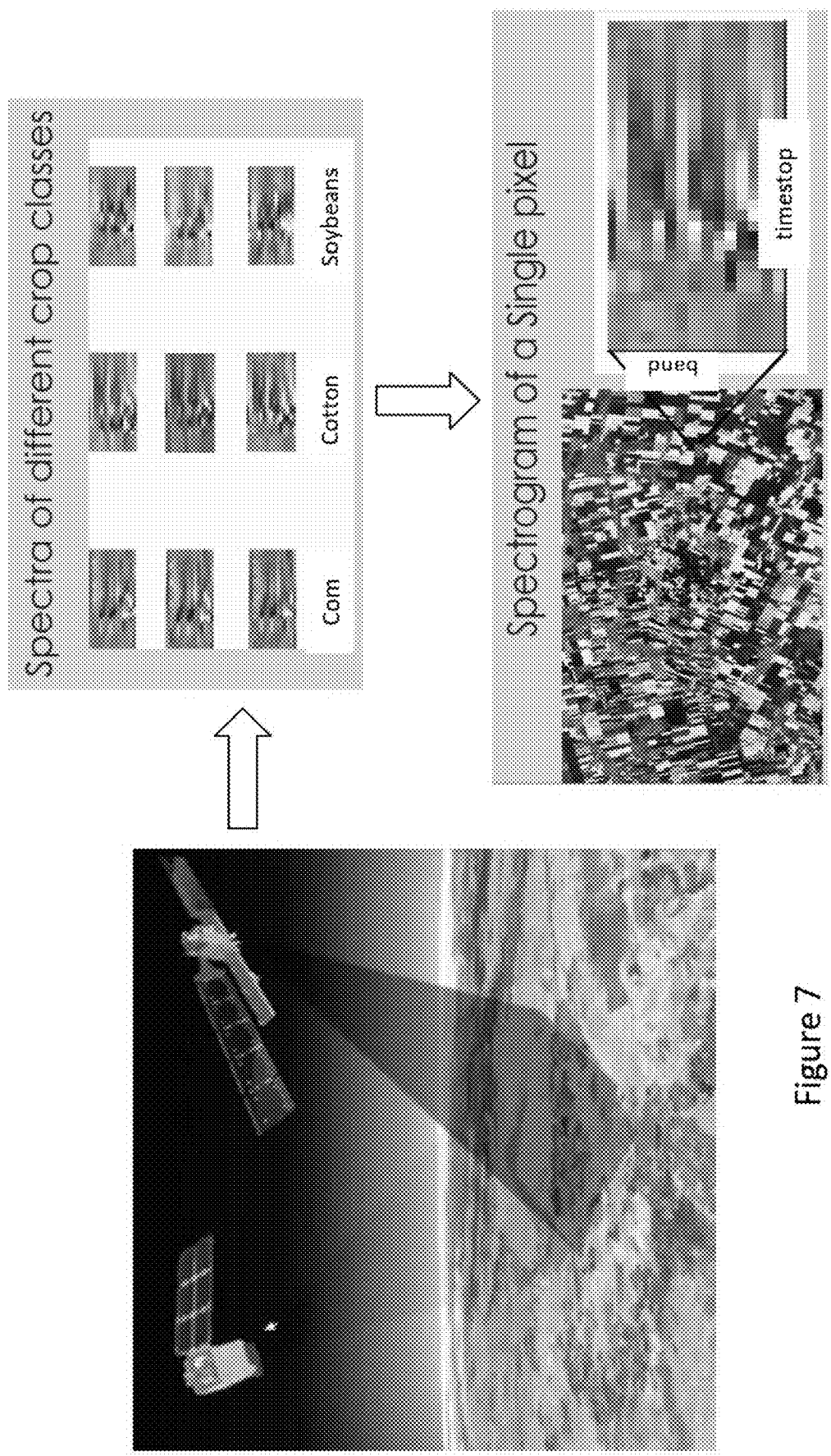
FIG. 7 is a pictorial diagram illustrating an example of the seasonal image data obtained from at least one source according to an embodiment of the invention.

FIG. 7 is a pictorial diagram illustrating an example of the seasonal image data obtained from at least one source, where the seasonal image serves as input to the agricultural monitoring system, apparatus and method(s) described herein. As shown, the seasonal image data are collected from satellite sources. The seasonal image data may be further processed to generate spectra of different crop types, and more specifically, the seasonal image data may be processed with respect to each pixel of an image corresponding to the different crop types, producing a spectrogram of a single pixel representation of an image corresponding to a crop planted in said at least one agricultural field. The resultant spectrogram may be used to train the crop model(s) and predict, based on the training, one or more crop states associated with a crop type.

Figure 8A:
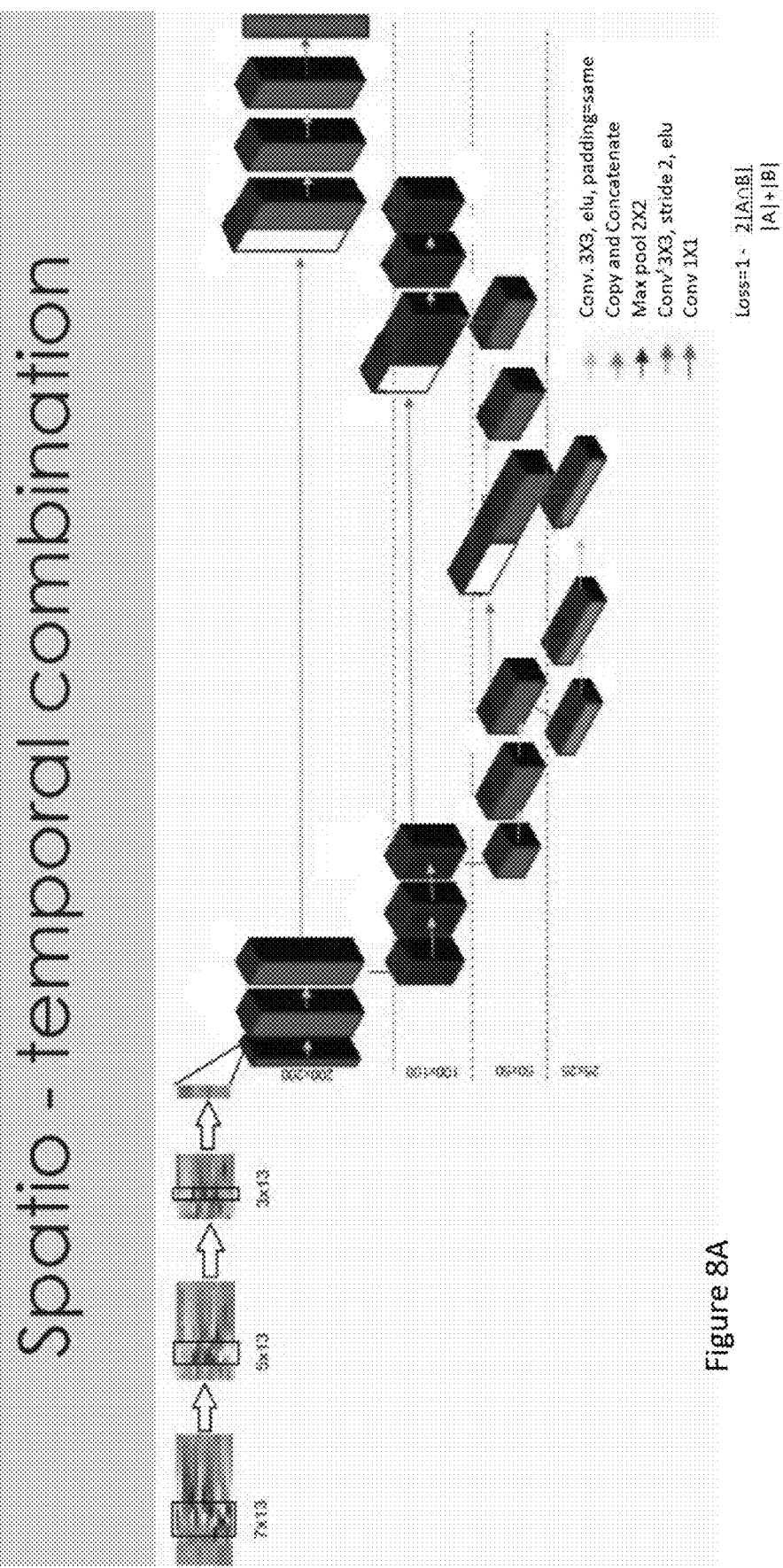
FIG. 8A is a pictorial diagram illustrating an example of training a machine learning model configured to process the seasonal data according to an embodiment of the invention.
Figure 8B:
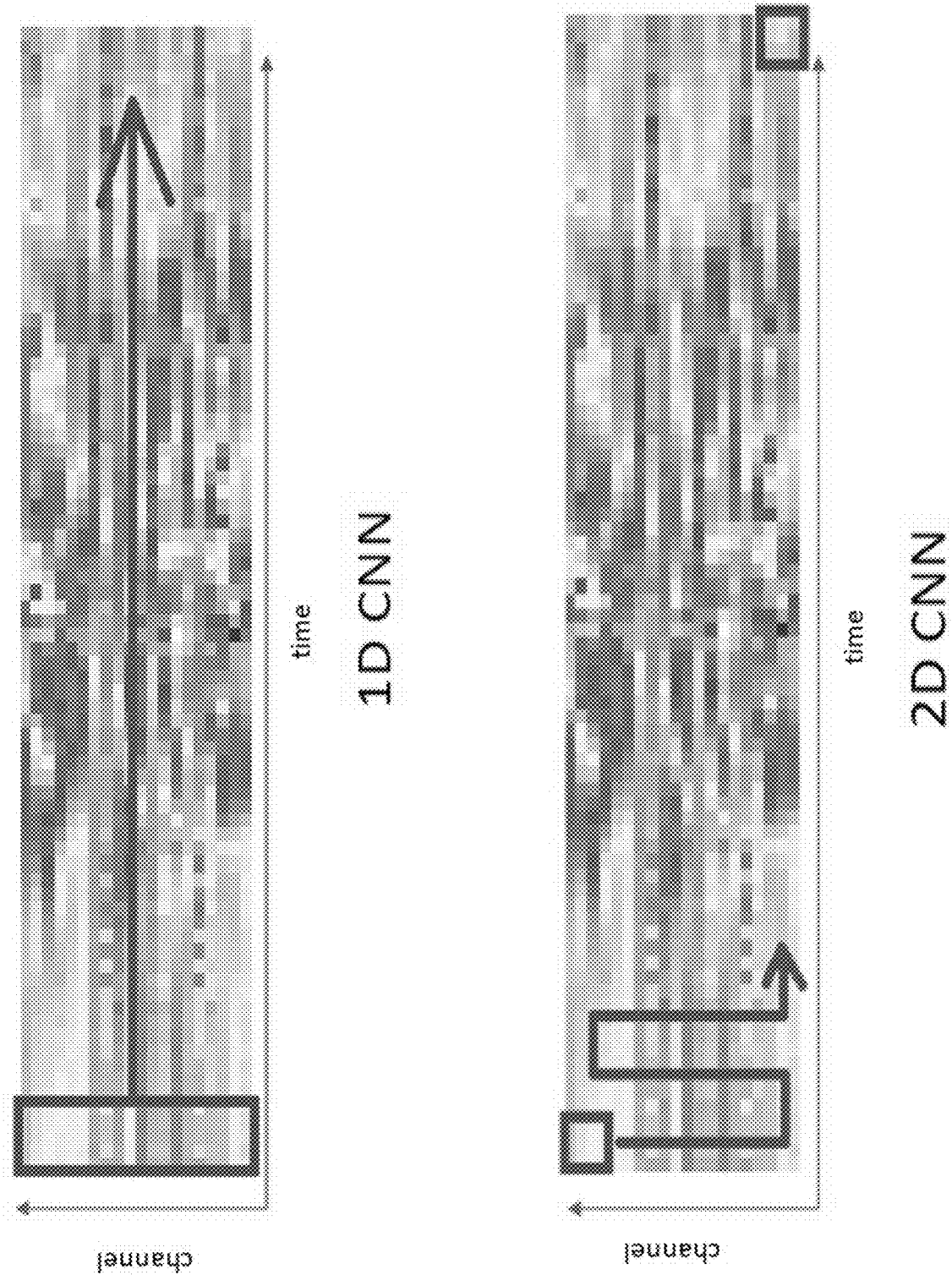
FIG. 8B is a pictorial diagram illustrating an example of using neural network to process the seasonal data according to an embodiment of the invention.

FIGS. 8A to 8C are pictorial diagrams illustrating an example of training a machine learning model configured to process the seasonal image data. The Machine Learning model may be used to pre-process seasonal image data and/or historical agricultural data in order to characterize features (capturing important attributes of the data that tend to be missed or ignored) within data such that the ML model may be deployed as the crop forecast model in the crop monitoring system according to FIGS. 4 and 5. Further, the ML model may be used in place of, or replacing one or more crop models and may be used according to any of the systems and/or methods described herein.

In one example, the ML model may comprise a convolutional neural network (CNN) to process image data, spanning all sensor channels and across the time axis. The CNN may be arranged to process segments of the data, i.e. data is segmented by sections 1 to N. By doing so, the use of the network serves as a roaming detector along the time axis of the data. Further, the CNN may comprise causal convolutional layer(s). The CNN may be used in conjunction with a recurrent neural network (RNN), a Long-Short term Memory (LSTM), and/or a Gated Recurrent Unit (GRU) to provide the requisite output. The output may be used to update the Bayesian framework for further iteration(s) of the forecast.

As part of the Bayesian framework, a 1-D convolutional neural network (1DCNN) and a 2-D convolutional neural network (2DCNN) are shown in FIG. 8B, where either network may be used to process the image data of an agricultural field. It is understood that raw image data may be obtained from one or more satellite sources, and the data may be pre-processed, i.e. segmented and/or unified (or aggregated). Either 1DCNN or 2DCNN may serve as a roaming detector traversing the pre-processed image data as shown with respect to the time axis (of the crop seasons) and sensor channels. The processing may be done in a pixel-wised manner that enables more accurate and reliable performing, for example, crop classification via a crop model in the Bayesian framework to identify the crop and/or state of at least one crop (i.e. crop planting date) based on each pixel from segmented/unified images of the crop in the agricultural field.

The ML model(s) may also comprise one or more machine learning methods or techniques. Examples of these ML methods or techniques may include or be based on, by way of example only but is not limited to, one or more of: any ML technique or algorithm/method that can be used to generate a trained model based on a labelled and/or unlabeled training datasets; one or more supervised ML techniques; semi-supervised ML techniques; unsupervised ML techniques; linear and/or non-linear ML techniques; ML techniques associated with classification; ML techniques associated with regression and the like and/or combinations thereof. Some examples of ML techniques/model structures may include or be based on, by way of example only but is not limited to, one or more of active learning, multitask learning, transfer learning, neural message parsing, one-shot learning, dimensionality reduction, decision tree learning, association rule learning, similarity learning, data mining algorithms/methods, artificial neural networks (NNs, i.e. Convolutional Neural Network and/or Recurrent Neural Networks as shown in FIG. 8B), auto encoder/decoder structures, deep NNs, deep learning, deep learning ANNs, inductive logic programming, support vector machines (SVMs), sparse dictionary learning, clustering, Bayesian networks, types of reinforcement learning, representation learning, similarity and metric learning, sparse dictionary learning, genetic algorithms, rule-based machine learning, learning classifier systems, and/or one or more combinations thereof and the like.

During processing or when being processed by the above-described ML method(s) or technique(s), the seasonal image data and/or historical agricultural data used according to any of the preceding steps may be pre-processed and vectorized for further processing using the same or different ML method(s) or technique(s). This pre-processing and vectorization provides added flexibility in switching between various machine learning For example, a resultant spectrogram may be obtained during pre-processing using unifying algorithms. The resultant spectrogram serves as input to the neural network for providing a forecast prediction. The network may be trained previously using data arranged in a similar manner from a previous season. Based on the resultant spectrogram, the network is enabled to make a threshold determination of whether the crop state information or any of the interested information is captured in the selected image data. More specifically, the CNN puts spectrogram input through a set of convolutional filters, carrying forward only the active features by mapping negative values to zero and maintaining only the positive values in the spectrogram input. The CNN down samples the remaining spectrogram data by simplifying the output of the network, reducing the number of parameters. The output of the CNN may be in the form of one or more vectors corresponding to the prediction made or in the desired format for further processing by a second ML model, or in this case, an RNN. The output from the RNN may be further processed in relation to the Bayesian framework.

Figure 9:
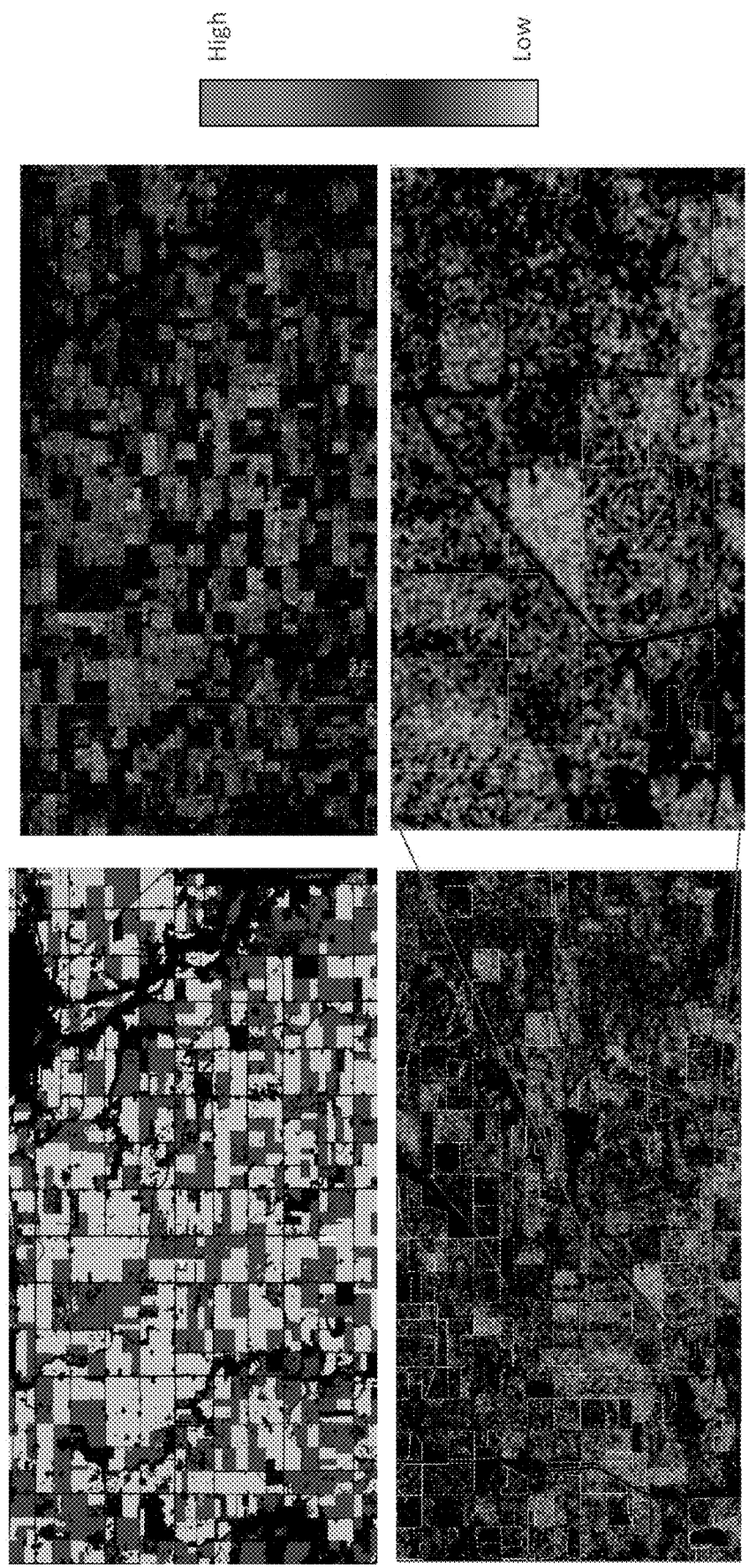
FIG. 9 is a pictorial diagram illustrating an example of pixel-wised processing of the seasonal image for processing by a Bayesian framework according to an embodiment of the invention.

FIG. 9 is a pictorial diagram illustrating an example of pixel-wised processing of the seasonal image obtained from a satellite source of an agricultural field, where the seasonal image is presented in different formats for further processing. The seasonal image may be segmented when processed by, for example, a crop model in the Bayesian framework to correctly identify the crop and/or state of at least one crop (i.e. crop planting date) based on each pixel from segmented images of the crop to the extent that the format maintained. The seasonal images may also be combined using one or more unifying algorithms configured to fuse said one or more images for processing by the Bayesian framework.

Figure 10:
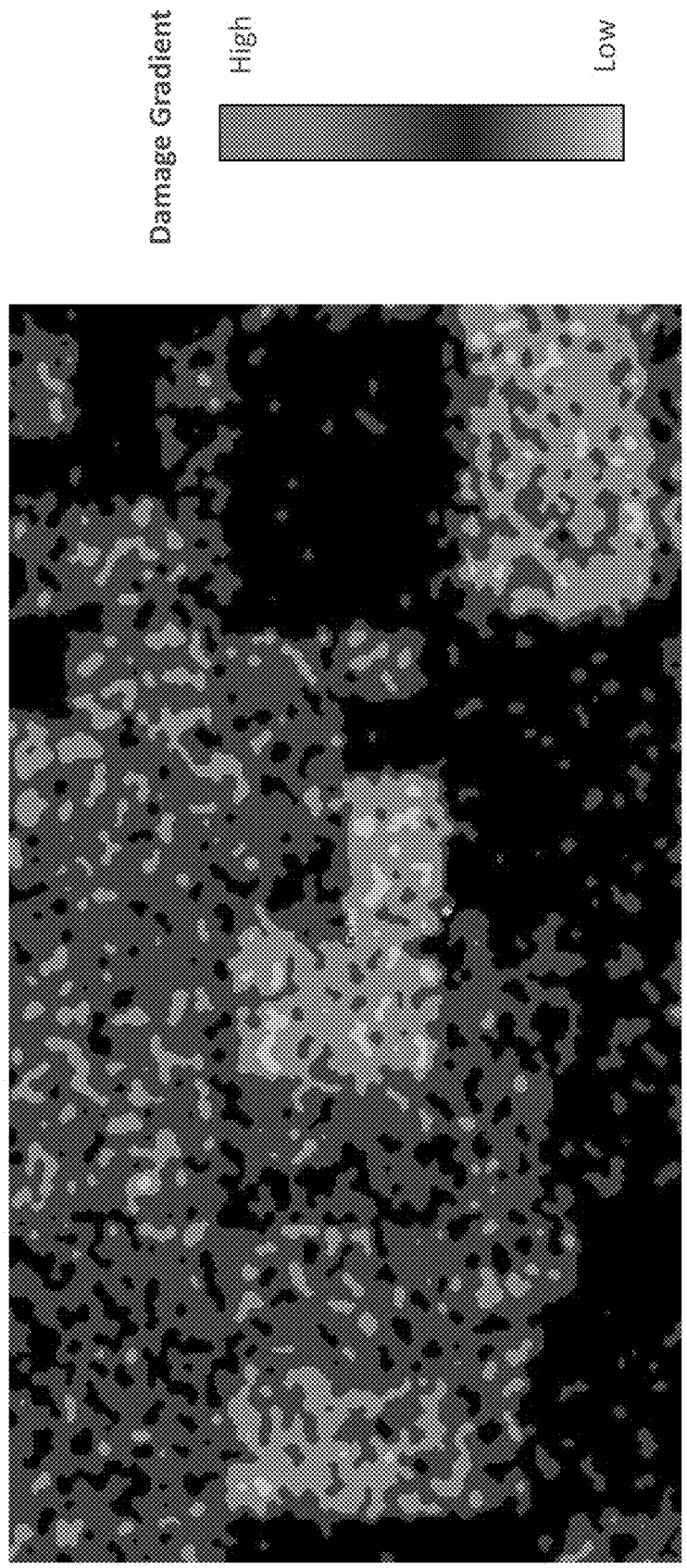
FIG. 10 is a pictorial diagram illustrating an example of segmented seasonal image data for a particular crop state according to an embodiment of the invention.

FIG. 10 is a pictorial diagram illustrating an example of segmented seasonal image data for a particular crop state. A gradient representative of crop damage is shown where the segmented image captures information on crop damage. Based on other data and models described herein, this information may be used to train a crop damage model to predict the level or degree of damage sustained by the crop. The damage may be caused by various environmental factors such as high wind, floods, and drought. The damage may also be caused by problems inherent to the crop type, such as disease insect damage, inadequate nutrition or compaction. The degree of damage is captured from further analysis of the seasonal image data.

Figure 11:
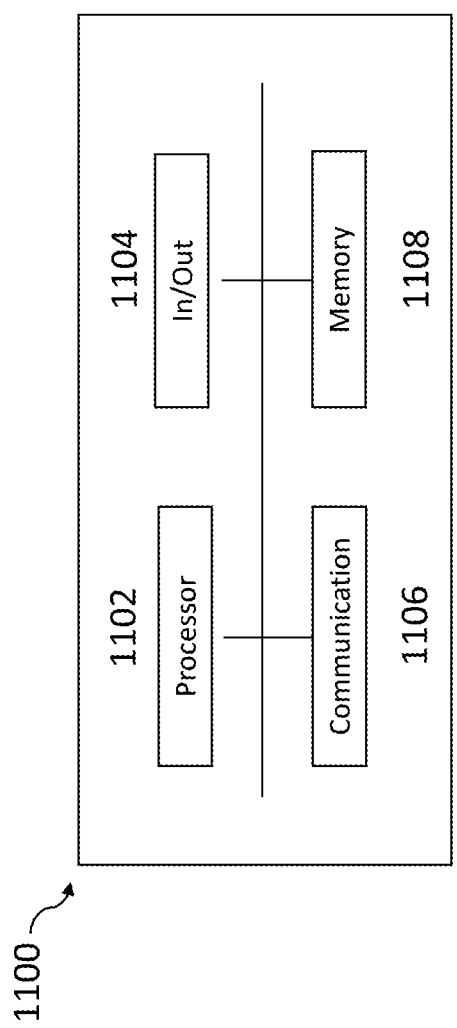
FIG. 11 is a block diagram of a computer or computing device suitable for implementing embodiments, examples, and/or aspects of the invention.

FIG. 11 is a block diagram illustrating an example computing apparatus/system 1100 that may be used to implement one or more aspects of the invention and any modifications thereof, and/or as described herein with reference to FIGS. 1 to 6. The computing apparatus/system 1100 includes one or more processor unit(s) 1102, an input/output unit 1104, communications unit/interface 1106, a memory unit 1108 in which the one or more processor unit(s) 1102 are connected to the input/output unit 1104, communications unit/interface 1106, and the memory unit 1108. In some embodiments, the computing apparatus/system 1100 may be a server, or one or more servers networked together. In some embodiments, the computing apparatus/system 1100 may be a computer or supercomputer/processing facility or hardware/software suitable for processing or performing the one or more aspects of the system(s), apparatus, method(s), and/or process(es) combinations thereof, modifications thereof, and/or as described with reference to any of the figures. The communications interface 1106 may connect the computing apparatus/system 1100, via a communication network, with one or more services, devices, the server system(s), cloud-based platforms, systems for implementing subject-matter databases and/or knowledge graphs for implementing the invention as described herein. The memory unit 1108 may store one or more program instructions, code or components such as, by way of example only but not limited to, an operating system and/or code/component(s) associated with the process(es)/method(s) as described with reference to FIGS. 1 to 3, additional data, applications, application firmware/software and/or further program instructions, code and/or components associated with implementing the functionality and/or one or more function(s) or functionality associated with one or more of the method(s) and/or process(es) of the device, service and/or server(s) hosting the process(es)/method(s)/system(s), apparatus, mechanisms and/or system(s)/platforms/architectures for implementing the invention as described herein.

In the embodiments, examples, and aspects of the invention as described above such as process(es), method(s), system(s) may be implemented on and/or comprise one or more cloud platforms, one or more server(s) or computing system(s) or device(s). A server may comprise a single server or network of servers, the cloud platform may include a plurality of servers or network of servers. In some examples, the functionality of the server and/or cloud platform may be provided by a network of servers distributed across a geographical area, such as a worldwide distributed network of servers, and a user may be connected to an appropriate one of the network of servers based upon a user location and the like.

Further, it is understood at least the following aspects of the invention may be combined with aspects of any of the other examples, or with any examples of the optional features described herein.

In one aspect is a computer-implemented method of forecasting and/or analyzing crop states based on at least one data source, the method comprising: receiving seasonal image data from at least one source, wherein the seasonal image data is associated with at least one agricultural field; processing the seasonal image data using a Bayesian framework, wherein the Bayesian framework comprises one or more crop models configured to predict, based on the seasonal image data, one or more probabilities indicative of at least one crop state; updating at least one crop model of the Bayesian framework based on said one or more probabilities; and outputting a forecast of said at least one crop state based on said one or more probabilities.

In another aspect is system for monitoring crop growth in an agricultural field, the system comprising: one or more modules adapted to forecast one or more crop states based on seasonal image data obtained from at least one source, wherein said one or more modules are configured to: receive the seasonal image data comprises one or more images associated with at least one crop type, wherein the seasonal image data, when obtained from two or more sources, can be combined using one or more unifying algorithms configured to fuse said one or more images for processing by a Bayesian framework, wherein the Bayesian framework comprises one or more crop models configured to predict, based on the received seasonal image data, one or more probabilities indicative of at least one crop state; update at least one crop model of the Bayesian framework based on said one or more probabilities, wherein said at least one crop model comprises a base model associated with said at least one crop type; and output a forecast of said at least one crop state based on said one or more probabilities.

In yet another aspect is a Bayesian framework for determining one or more probabilities of a crop state given predetermined probability distribution associated with the crop state estimated from one or more previous agricultural seasons, the framework comprising: one or more crop models configured to forecast a plurality of crop state, wherein each crop state is predicted using a crop model trained using seasonal image data from a previous agricultural season; and wherein the Bayesian framework is iteratively updated with respect to further seasonal image data obtained from one or more following agricultural seasons to the previous agricultural season.

In yet another aspect is a computer-readable medium comprising data or instruction code which, when executed on a processor, causes the processor to perform a method according to any one of the above aspects. In yet another aspect is apparatus comprising a processor unit, a memory unit, a communications interface, the processor unit connected to the memory unit and communications interface, wherein the apparatus is adapted to perform a process according to any one of the above aspects.

As an option, said one or more crop models comprise at least one base model conditioned on at least two crop states in a previous agricultural season. As an option, said at least one base model is trained using annotated historical common land unit data, in order to predict said at least two crop states in an agricultural season following the previous agricultural season. As an option, said at least two crop states in the agricultural season are calculated at least in part from said seasonal image data. As an option, said at least one base model is configured to generate the forecast of said at least one crop state based on said seasonal image data. As an option, each crop state is a crop type, a crop planting date, a crop yield, a crop acreage, a crop emergence date, a crop harvest date, or a damage to crop. As an option, the seasonal image data is processed with respect to each pixel of an image corresponding to a crop planted in said at least one agricultural field.

As an option, further comprising: configuring the Bayesian framework to model a crop state in a previous agricultural season using seasonal image data of the previous agricultural season; and recalibrating said one or more probabilities based on the configured Bayesian framework, wherein said one or more probabilities are adapted to outputs of said one or more crop models. As an option, the Bayesian framework is configured to: classify, based on a crop type, at least one crop from at least one subset of the seasonal image data; determine said one or more probabilities for each classified crop; and update the Bayesian framework based on the classification in relation to said one or more probabilities. As an option, said one or more crop models comprises a crop planting date prediction model, crop yield prediction model, crop acreage model, cover crop model, crop emergence date model, crop harvest model, and crop damage model. As an option, each crop model is configured to generate, based on said one or more probabilities, a crop state prediction associated with said at least one agricultural field in relation to the seasonal image data from at least one agricultural season.

As an option, each crop model is trained using the seasonal image data annotated with respect to at least one crop from said at least one agricultural field. As an option, each crop model is trained using a labelled training dataset comprising historical planting information annotated with respect to at least one crop from said at least one agricultural field. As an option, each crop model is adapted to learn from a subset of seasonal image data, wherein the subset comprises images outputted from a data source that is different to the data source used in another crop model when more than one crop model is/are being used to determine said at least one crop state. As an option, further comprising: predicting at least one crop state in a following agricultural season with respect to said one or more probabilities based on said seasonal image data from at least one agricultural season. As an option, further comprising: predicting a crop planting date using a crop planting date prediction model, wherein the crop planting date corresponds to a probability indicative of a planting event of the crop. As an option, wherein event comprises that the crop will be planted on or before the crop planting date.

As an option, further comprising: predicting a crop yield result using at least one crop yield prediction model, wherein the crop yield prediction model is configured to characterize growth of at least one crop in order to provide the crop yield result. As an option, further comprising: predicting an acreage estimate of a crop in said at least one agricultural field, wherein the acreage estimate is generated by a crop acreage model configured to characterize growth of the crop in said at least one agricultural field, and calculating, based on the growth, the acreage estimate of the crop. As an option, further comprising: predicting a cover crop type of a crop using a cover crop model configured to characterize growth of the crop; and determining, based on the growth, the cover crop type from one or more possible types of cover crops. As an option, further comprising: predicting a date of crop emergence using a crop emergence date model, wherein the date of crop emergence corresponds to a probability indicative of a potential emergence event that will occur or will not occur, on or before said date. As an option, further comprising: predicting a crop harvest using a crop harvest model configured to determine when a harvest event needs to take place in a following agriculture season based on a probability indicative of a crop state. As an option, further comprising: predicting a damage to crop using a crop damage model configured to identify based on a crop state the damage to the crop has or will take place.

As an option, said at least one source comprises one or more satellite sources. As an option, updating the Bayesian framework, further comprising: receiving the one or more set(s) of weighted confidence predictions, associated with each crop model; determining whether the received one or more set(s) of weighted confidence predictions is within a predetermined range; and predicting said one or more probabilities based on the determination. As an option, further comprising: if the received information is not within a predetermined range, determining a separate set of weighted confidence information different from the received one or more set(s) of weighted confidence predictions; and predicting said one or more probabilities based on the received one or more set(s) of the weighted confidence information and the second set of weighted confidence information. As an option, wherein each crop model is configured to receive weighted confidence information from at least one other crop model. As an option, wherein said at least one other crop model is from a different agricultural field. As an option, further comprising: validating each crop model based on the output of at least one other crop model; and updating at least one model in the Bayesian framework based on the validation. As an option, further comprising: generating a dynamic rule set amongst at least two crop models based on said at least one crop state and weighted confidence information associated with said at least two crop models; combining said at least two crop models to form an ensemble model based on an order provided by the dynamic rule set, wherein the order is determined based on the output of each of said at least two crop models; updating the ensemble model based on the seasonal image data until the ensemble model is able to predict a crop state in the following agricultural season within at least one confidence interval in relation to the dynamic rule set; providing the ensemble model as part of the Bayesian framework for generating the forecast; and updating the dynamic rule set based on the forecast.

The above description discusses embodiments of the invention with reference to a single user for clarity. It will be understood that in practice the system may be shared by a plurality of users, and possibly by a very large number of users simultaneously.

The embodiments described above may be configured to be semi-automatic and/or are configured to be fully automatic. In some examples a user or operator of the querying system(s)/process(es)/method(s) may manually instruct some steps of the process(es)/method(es) to be carried out.

The described embodiments of the invention a system, process(es), method(s) and the like according to the invention and/or as herein described may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the process/method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium or non-transitory computer-readable medium. Computer-readable media may include, for example, computer-readable storage media. Computer-readable storage media may include volatile or non-volatile, removable or non-removable media implemented in any method or technology for storage of information such as computer-readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray disc (BD). Further, a propagated signal is not included within the scope of computer-readable storage media. Computer-readable media also includes communication media including any medium that facilitates transfer of a computer program from one place to another. A connection or coupling, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realize that such processing capabilities are incorporated into many different devices and therefore the term 'computer' includes PCs, servers, IoT devices, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary", "example" or "embodiment" is intended to mean "serving as an illustration or example of something". Further, to the extent that the term "includes" is used in either the detailed description or the claims, such a term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, subroutines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the invention. Aspects of any of the examples described above may be combined with aspects of any of the other examples described to form further examples without losing the effect sought.

It will be understood that the above description of embodiments of the invention is given by way of example only and that various modifications may be made by those skilled in the art.

What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations.

What is claimed is:

1. A computer-implemented method of forecasting and/or analyzing crop states based on at least one data source, the method comprising:
receiving seasonal image data from at least one source, wherein the seasonal image data is associated with at least one agricultural field;
processing the seasonal image data using a Bayesian framework, wherein the Bayesian framework comprises one or more crop models configured to predict, based on the seasonal image data, one or more probabilities indicative of at least one crop state;
updating at least one crop model of the Bayesian framework based on said one or more probabilities; and
outputting a forecast of said at least one crop state based on said one or more probabilities, wherein updating the Bayesian framework, further comprises
receiving the one or more set(s) of weighted confidence predictions, associated with each crop model;
determining whether the received one or more set(s) of weighted confidence predictions is within a predetermined range;
predicting said one or more probabilities based on the determination;
if the received information is not within a predetermined range, determining a separate set of weighted confidence information different from the received one or more set(s) of weighted confidence predictions; and
predicting said one or more probabilities based on the received one or more set(s) of the weighted confidence information and the second set of weighted confidence information.

2. The method of claim 1, wherein said at least one base model is trained using annotated historical common land unit data, in order to predict said at least two crop states in an agricultural season following the previous agricultural season.

3. The method of claim 1, wherein said at least one base model is configured to generate the forecast of said at least one crop state based on said seasonal image data.

4. The method of claim 1, wherein the seasonal image data is processed with respect to each pixel of an image corresponding to a crop planted in said at least one agricultural field.

5. The method of claim 1, further comprising:
configuring the Bayesian framework to model a crop state in a previous agricultural season using seasonal image data of the previous agricultural season; and
recalibrating said one or more probabilities based on the configured Bayesian framework, wherein said one or more probabilities are adapted to outputs of said one or more crop models.

6. The method of claim 1, wherein the Bayesian framework is configured to:
classify, based on a crop type, at least one crop from at least one subset of the seasonal image data;
determine said one or more probabilities for each classified crop; and
update the Bayesian framework based on the classification in relation to said one or more probabilities.

7. The method of claim 1, wherein each crop model is configured to generate, based on said one or more probabilities, a crop state prediction associated with said at least one agricultural field in relation to the seasonal image data from at least one agricultural season.

8. The method of claim 1, wherein each crop model is trained using the seasonal image data annotated with respect to at least one crop from said at least one agricultural field.

9. The method of claim 1, wherein each crop model is trained using a labeled training dataset comprises historical planting information annotated with respect to at least one crop from said at least one agricultural field.

10. The method of claim 1, wherein each crop model is adapted to learn from a subset of seasonal image data, wherein the subset comprises images outputted from a data source that is different from the data source used in another crop model when more than one crop model is/are being used to determine said at least one crop state.

11. The method of claim 1, further comprising:
predicting at least one crop state in a following agricultural season with respect to said one or more probabilities based on said seasonal image data from at least one agricultural season.

12. The method of claim 1, further comprising:
predicting a crop planting date using a crop planting date prediction model, wherein the crop planting date corresponds to a probability indicative of a planting event of the crop.

13. The method of claim 1, further comprising:
predicting a crop yield result using at least one crop yield prediction model, wherein the crop yield prediction model is configured to characterize growth of at least one crop in order to provide the crop yield result.

14. The method of claim 1, further comprising:
predicting an acreage estimate of a crop in said at least one agricultural field, wherein the acreage estimate is generated by a crop acreage model configured to characterize growth of the crop in said at least one agricultural field, and calculating, based on the growth, the acreage estimate of the crop.

15. The method of claim 1, further comprising:
predicting a cover crop type of a crop using a cover crop model configured to characterize growth of the crop; and determining, based on the growth, the cover crop type from one or more possible types of cover crops.

16. The method of claim 1, further comprising:
predicting a date of crop emergence using a crop emergence date model, wherein the date of crop emergence corresponds to a probability indicative of a potential emergence event that will occur or will not occur, on or before said date.

17. The method of claim 1, further comprising:
predicting a crop harvest using a crop harvest model configured to determine when a harvest event needs to take place in a following agriculture season based on a probability indicative of a crop state.

18. The method of claim 1, further comprising:
predicting a damage to crop using a crop damage model configured to identify based on a crop state the damage to the crop has or will take place.

19. A computer-implemented method of forecasting and/or analyzing crop states based on at least one data source, the method comprising:
receiving seasonal image data from at least one source, wherein the seasonal image data is associated with at least one agricultural field;
processing the seasonal image data using a Bayesian framework, wherein the Bayesian framework comprises one or more crop models configured to predict, based on the seasonal image data, one or more probabilities indicative of at least one crop state;
updating at least one crop model of the Bayesian framework based on said one or more probabilities;
outputting a forecast of said at least one crop state based on said one or more probabilities;
generating a dynamic rule set amongst at least two crop models based on said at least one crop state and weighted confidence information associated with said at least two crop models;
combining said at least two crop models to form an ensemble model based on an order provided by the dynamic rule set, wherein the order is determined based on the output of each of said at least two crop models;
updating the ensemble model based on the seasonal image data until the ensemble model is able to predict a crop state in the following agricultural season within at least one confidence interval in relation to the dynamic rule set;
providing the ensemble model as part of the Bayesian framework for generating the forecast; and
updating the dynamic rule set based on the forecast.

* * * * *